(12) United States Patent
Sato

(10) Patent No.: US 8,745,433 B2
(45) Date of Patent: Jun. 3, 2014

(54) MEMORY DEVICE, BOARD, LIQUID CONTAINER, HOST DEVICE, AND SYSTEM

(75) Inventor: Jun Sato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 553 days.

(21) Appl. No.: 13/031,152

(22) Filed: Feb. 18, 2011

(65) Prior Publication Data

US 2011/0208991 A1    Aug. 25, 2011

(30) Foreign Application Priority Data

Feb. 22, 2010  (JP) ................................ 2010-035898
Jan. 18, 2011  (JP) ................................ 2011-007766

(51) Int. Cl.
*G06F 1/00* (2006.01)
*B41J 2/175* (2006.01)

(52) U.S. Cl.
USPC ............. 713/600; 713/500; 713/502; 347/19; 347/50; 347/86

(58) Field of Classification Search
USPC .................. 713/500, 502, 600; 347/19, 50, 86
See application file for complete search history.

(56) References Cited

U.S. PATENT DOCUMENTS

| | | | |
|---|---|---|---|
| 5,938,742 | A | 8/1999 | Faddell et al. |
| 6,749,281 | B2 | 6/2004 | Asauchi |
| 7,321,436 | B2 | 1/2008 | Asauchi |
| 2002/0016893 | A1 | 2/2002 | Asauchi |
| 2002/0191041 | A1 | 12/2002 | Asauchi |
| 2005/0289377 | A1* | 12/2005 | Luong et al. ............. 713/322 |
| 2006/0139692 | A1 | 6/2006 | Asauchi |
| 2007/0030508 | A1 | 2/2007 | Asauchi |
| 2007/0279690 | A1 | 12/2007 | Asauchi |
| 2008/0106757 | A1 | 5/2008 | Asauchi |
| 2009/0153610 | A1 | 6/2009 | Kosugi |
| 2009/0262161 | A1 | 10/2009 | Nishihara |

FOREIGN PATENT DOCUMENTS

| | | |
|---|---|---|
| EP | 1 547 781 A2 | 6/2005 |
| JP | 2517540 Y2 | 11/1996 |
| JP | 2002-014870 A | 1/2002 |
| JP | 2002-370383 A | 12/2002 |
| JP | 2006-127407 A | 5/2006 |
| JP | 2007-001208 A | 1/2007 |
| JP | 2009-274438 A | 11/2009 |

OTHER PUBLICATIONS

U.S. Appl. No. 13/031,137, filed Feb. 18, 2011, entitled "Storage Device, Substrate, Liquid Container, Host Device, and System", 51 pages.
U.S. Appl. No. 13/031,145, filed Feb. 18, 2011, entitled "Storage Device, Substrate, Liquid Container, Host Device, and System", 62 pages.
U.S. Appl. No. 13/031,155, filed Feb. 18, 2011, entitled "Storage Device, Board, Liquid Container and System", 117 pages.

* cited by examiner

*Primary Examiner* — Kim Huynh
*Assistant Examiner* — Michael J Brown
(74) *Attorney, Agent, or Firm* — Kilpatrick Townsend & Stockton LLP

(57) ABSTRACT

A memory device includes a memory unit, a memory control unit that controls an access of the memory unit, a control unit that performs a communication process with a host device, a data terminal, a reset terminal, and a clock terminal. The control unit outputs a response signal for reporting the connection of the memory device to the host device through the data terminal in an m-th clock cycle (m is at least an integer of $1 \le m \le n$) corresponding to ID information of the memory device among first to n-th clock cycles (n is an integer of 2 or more) of clocks input to the clock terminal.

17 Claims, 15 Drawing Sheets

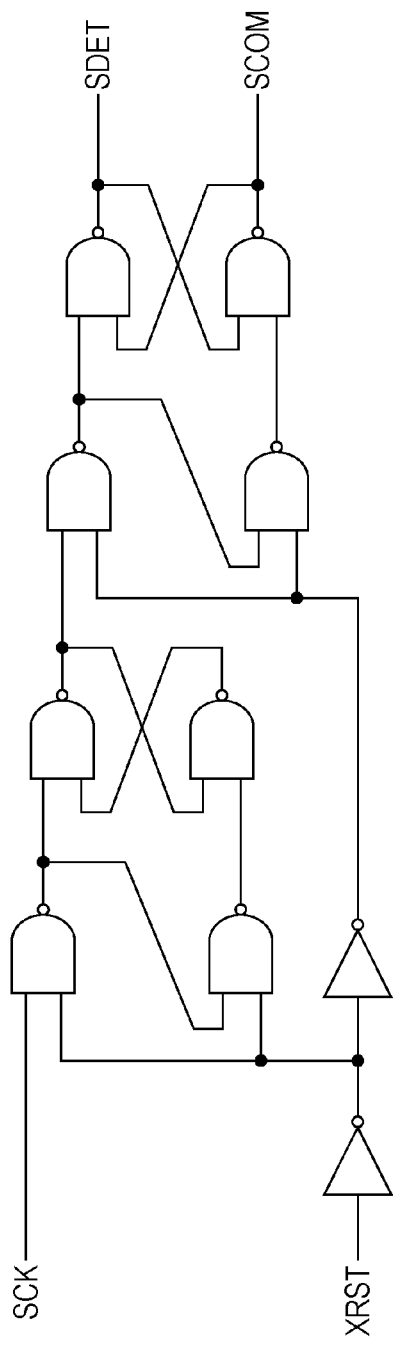

FIG. 8A
| MODE | XRST | SCK | SDA | SDET | SCOM |
|---|---|---|---|---|---|
| ACCESS DETECTION MODE | L | ⌐ | L | H | L |
| NORMAL COMMUNICATION MODE | H | ⌐ | L | L | H |
FIG. 8B
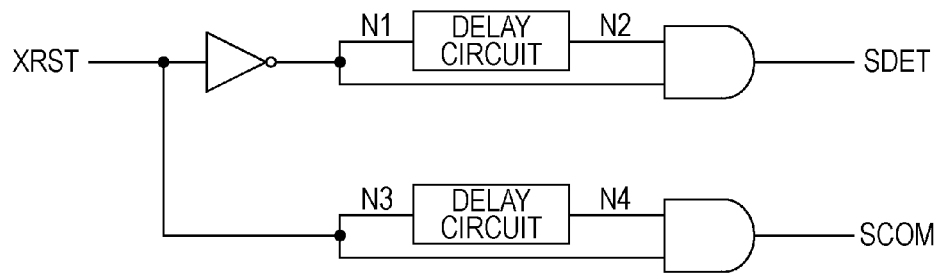
FIG. 8C
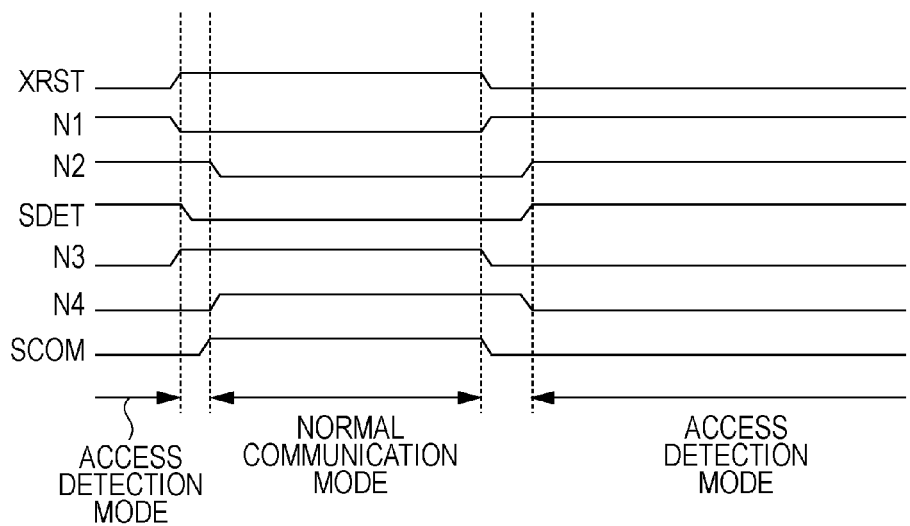

FIG. 10

| ID INFORMATION | bit2 | bit1 | bit0 | CLOCK CYCLE |
|---|---|---|---|---|
| ID = 0 | 0 | 0 | 0 | UNUSED |
| ID = 1 | 0 | 0 | 1 | T1 |
| ID = 2 | 0 | 1 | 0 | T2 |
| ID = 3 | 0 | 1 | 1 | T3 |
| ID = 4 | 1 | 0 | 0 | T4 |
| ID = 5 | 1 | 0 | 1 | T5 |
| ID = 6 | 1 | 1 | 0 | T6 |
| ID = 7 | 1 | 1 | 1 | T7 |

FIG. 11

|  |  | T1 | T2 | T3 | T4 | T5 | T6 | T7 |
|---|---|---|---|---|---|---|---|---|
| ONE-COLOR TYPE | ID = 1 | RESPONSE | Hi-Z | Hi-Z | Hi-Z | Hi-Z | Hi-Z | Hi-Z |
|  | ID = 2 | Hi-Z | RESPONSE | Hi-Z | Hi-Z | Hi-Z | Hi-Z | Hi-Z |
|  | ID = 3 | Hi-Z | Hi-Z | RESPONSE | Hi-Z | Hi-Z | Hi-Z | Hi-Z |
|  | ID = 4 | Hi-Z | Hi-Z | Hi-Z | RESPONSE | Hi-Z | Hi-Z | Hi-Z |
| 4-COLOR INTEGRATED TYPE | ID = 7 | RESPONSE | RESPONSE | RESPONSE | RESPONSE | Hi-Z | Hi-Z | Hi-Z |
| BLACK AND COLOR INTEGRATED TYPE | BLACK ID = 1 | RESPONSE | Hi-Z | Hi-Z | Hi-Z | Hi-Z | Hi-Z | Hi-Z |
|  | COLOR ID = 6 | Hi-Z | RESPONSE | RESPONSE | RESPONSE | Hi-Z | Hi-Z | Hi-Z |

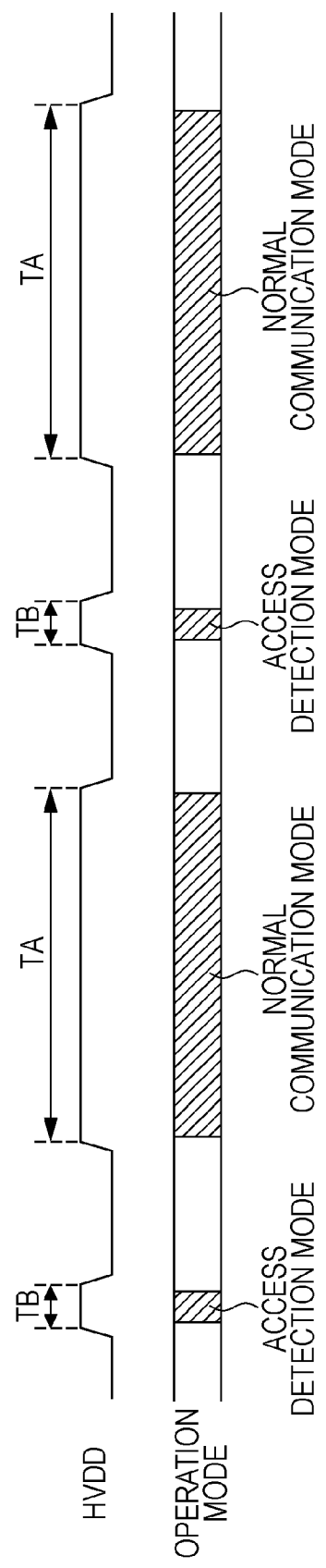

MEMORY DEVICE, BOARD, LIQUID CONTAINER, HOST DEVICE, AND SYSTEM

BACKGROUND

1. Technical Field

The present invention relates to a memory device, a board, a liquid container, a host device, and a system.

2. Related Art

In a printer provided with an ink cartridge (a liquid container), it is necessary to detect whether or not the ink cartridge is mounted, in order to prevent a printing process from being performed in a state where the ink cartridge is not mounted.

In regard to this topic, for example, a method is disclosed in JP-A-2002-14870 in which a printer and an ink cartridge are provided with detection terminals to detect electrical connection, thereby detecting whether or not the ink cartridge is mounted. However, in this method, there is a problem that the number of terminals increases.

For example, a method is disclosed in JP-A-2009-274438 in which terminals for detecting the amount of remaining ink are commonly used to detect whether or not the ink cartridge is mounted. However, in this method, when the detection of the amount of remaining ink is changed to another method, it is difficult to reduce the number of terminals.

SUMMARY

An advantage of some aspect of the invention is to provide a memory device, a board, a liquid container, a host device, and a system capable of efficiently detecting the connection without increasing the number of terminals.

According to an aspect of the invention, there is provided a memory device including: a memory unit; a memory control unit that controls access of the memory unit; a control unit that performs a communication process with a host device; a data terminal; a reset terminal; and a clock terminal, wherein the control unit outputs a response signal for reporting the connection of a memory device with respect to an m-th (m is at least an integer of $1 \leq m \leq n$) clock cycle corresponding to ID information of the memory device among a first clock cycle to an n-th (n is an integer of 2 or more) clock cycle of clocks input to the clock terminal, to the host device through the data terminal.

According to the aspect of the invention, since it is possible to detect whether or not each memory device is connected in each clock cycle period, it is possible to reduce the time taken for detection. Since it is possible to output the response signal for reporting the connection of the memory device to the host device through the data terminal, a terminal for detecting the connection is unnecessary and it is possible to reduce the number of terminals. As a result, it is possible to efficiently detect the connection of the memory device.

In the memory device according to the aspect of the invention, it is preferable that the control unit outputs the response signal by setting a voltage level of the data terminal to a second voltage level in a first period of the m-th clock cycle and setting the data terminal to a high impedance state in a second period after the first period of the m-th clock cycle.

With such a configuration, since the data terminal SDA is in a high impedance state in the second period of the clock cycle, it is possible to prevent two response signals from interfering with each other when a response signal is output in the next clock cycle.

In the memory device according to the aspect of the invention, it is preferable that the control unit includes a mode determining unit that determines whether an operation mode is a normal communication mode or a connection detection mode, and a response unit that performs an instruction to output the response signal, and when it is determined that the operation mode is the connection detection mode, the response unit performs an instruction to output the response signal in the m-th clock cycle.

With such a configuration, since it is possible to perform the instruction to output the response signal when the operation mode is determined as the detection mode, it is possible to perform a control process for detecting the connection while being distinguished from the normal communication mode. When the ID information is stored in the memory unit, the control process is performed while being distinguished from the normal communication mode to limit the access to the memory unit in accordance with the ID information. Accordingly, it is possible to prevent the stored data from being unintentionally broken.

In the memory device according to the aspect of the invention, it is preferable that the mode determining unit determines that the operation mode is the connection detection mode when the voltage level of the reset terminal is changed from a voltage level indicating a reset state to a voltage level indicating a reset release state in a period when the voltage level of the clock terminal is the second voltage level.

With such a configuration, it is possible to determine the operation mode according to whether the voltage level of the clock terminal is the first voltage level or the second voltage level at the timing of changing from the reset state to the reset release state. In such a manner, since a specific signal for setting the operation mode is unnecessary, it is possible to reduce the number of terminals.

In the memory device according to the aspect of the invention, it is preferable that the mode determining unit determines that the operation mode is the connection detection mode when the voltage level of the clock terminal is changed from the first voltage level to the second voltage level in a period when the voltage level of the reset terminal is the voltage level indicating a reset state.

With such a configuration, it is possible to determine the operation mode according to whether the state is the reset state or the reset release state at the timing of changing the voltage level of the clock terminal from the first voltage level to the second voltage level. In such a manner, since a specific signal for setting the operation mode is unnecessary, it is possible to reduce the number of terminals.

In the memory device according to the aspect of the invention, it is preferable that the response unit determines a timing of changing the clock terminal voltage level from the second voltage level to the first voltage level after the clock terminal voltage level is changed from the first voltage level to the second voltage level after supplying power, as a start timing of the first clock cycle, and the response unit performs an instruction to output the response signal in the m-th clock cycle after the start timing.

With such a configuration, since it is possible to define the start timing of the first clock cycle, it is possible to output the response signal at a proper timing in the clock cycle corresponding to the ID information.

In the memory device according to the aspect of the invention, it is preferable that the response unit determines a timing of changing the voltage level of the clock terminal from the second voltage level to the first voltage level after a period longer than one TC from the timing of supplying power is elapsed where a TC is a length of each clock cycle of the clocks input to the clock terminal, as the start timing.

With such a configuration, during the period from the power supply timing to the start timing of the first clock cycle, it is possible to secure the time until the ID information is read from the memory unit after the mode determining unit determines the operation mode as the connection detection mode.

In the memory device according to the aspect of the invention, it is preferable that the response unit includes a counter and a coincidence determining unit that determines whether or not a count value of the counter and a value of the ID information read from the memory unit coincide with each other, and the response unit performs an instruction to output the response signal when the count value and the value of the ID information coincide with each other.

With such a configuration, it is possible to reliably output the response signal in the clock cycle corresponding to the ID information.

In the memory device according to the aspect of the invention, it is preferable that the counter performs a count process of the clocks input to the clock terminal after the start timing.

With such a configuration, since it is possible to appropriately count the clock cycles from the first clock cycle to the n-th clock cycle, it is possible to output the response signal in the appropriate clock cycle corresponding to the ID information.

In the memory device according to the aspect of the invention, it is preferable that the response unit performs an instruction to output the response signal in a plurality of clock cycles among the first clock cycle to the n-th clock cycle.

With such a configuration, one memory device can output the response signal in the plurality of clock cycles.

According to another aspect of the invention, there is provided a board including the memory device according to the aspect.

According to still another aspect of the invention, there is provided a liquid container including the memory device according to the aspect.

According to the aspect of the invention, since it is possible to efficiently detect whether or not the memory device included in the liquid container is properly connected, it is possible to efficiently detect whether or not the liquid container is properly mounted.

In the liquid container according to the aspect of the invention, it is preferable that, when liquid with a plurality of colors is contained, the response signal is output in a plurality of clock cycles corresponding to the plurality of colors among the first clock cycle to the n-th clock cycle.

With such a configuration, even when the liquid with the plurality of colors is contained, it is possible to associate the plurality of colors with the plurality of clock cycles.

According to still another aspect of the invention, there is provided a system including the memory device according to the aspect and the host device.

According to the aspect of the invention, since the host device can efficiently detect whether or not the memory device is properly connected, it is possible to improve reliability of the system.

According to still another aspect of the invention, there is provided a host device including: a communication processing unit that performs a communication process with a first memory device to an n-th memory device (n is an integer of 2 or more) through a host side terminal of a first host terminal to a k-th host side terminal (k is an integer of 2 or more); and a monitoring unit, wherein the monitoring unit monitors whether or not a response signal is output from the first memory device to the n-th memory device in each clock cycle of a first clock cycle to an n-th clock cycle of clocks supplied to the first memory device to the n-th memory device.

According to the aspect of the invention, it is possible to detect whether or not the memory device is connected by monitoring whether or not there is the response signal in each clock cycle of the first to n-th clock cycles.

In the host device according to the aspect of the invention, it is preferable that the host device includes a power supply unit that supplies power to the first memory device to the n-th memory device, the power supply unit is provided with a power supply period of a connection detection mode between a power supply period of a normal communication mode and a power supply period of the next normal communication mode, and performs the power supply to be TA>TB where TA is a length of the power supply period of the normal communication mode and TB is a length of the power supply period of the connection detection mode.

With such a configuration, since it is possible to provide the short period of the connection detection mode between the period of one normal communication mode and the period of the next normal communication mode, it is possible to detect the connection of the memory device without trouble on normal data communication. As a result, it is possible to improve reliability of the system.

In the host device according to the aspect of the invention, it is preferable that the host device further includes a display control unit that controls a display unit to display a connection detection result in the connection detection mode.

With such a configuration, it is possible to display in real time whether or not the memory device is properly connected. As a result, errors are prevented from occurring when a user replaces the liquid container, and it is possible to improve operability.

BRIEF DESCRIPTION OF THE DRAWINGS

The invention is described with reference to the accompanying drawings, wherein like numbers reference like elements.

FIG. 6A and FIG. 6B are diagrams illustrating a first configuration example of a mode determining unit.

FIG. 8A to FIG. 8C are diagrams illustrating a second configuration example of the mode determining unit.

FIG. 10 is a diagram illustrating an example of correspondence between ID information and clock cycles.

FIG. 11 is a diagram illustrating another example of correspondence between ID information and clock cycles.

FIG. 16 is a diagram illustrating a power supply period of a normal communication mode and a connection detection mode.

DESCRIPTION OF EXEMPLARY EMBODIMENTS

Hereinafter, preferred embodiments of the invention are described. The embodiments described hereinafter do not unreasonably limit the contents of the invention described in Claims, and all the configurations described in the embodiments are not essential as resolution means of the invention.

1. Basic Configuration Example of System

Figure 1:
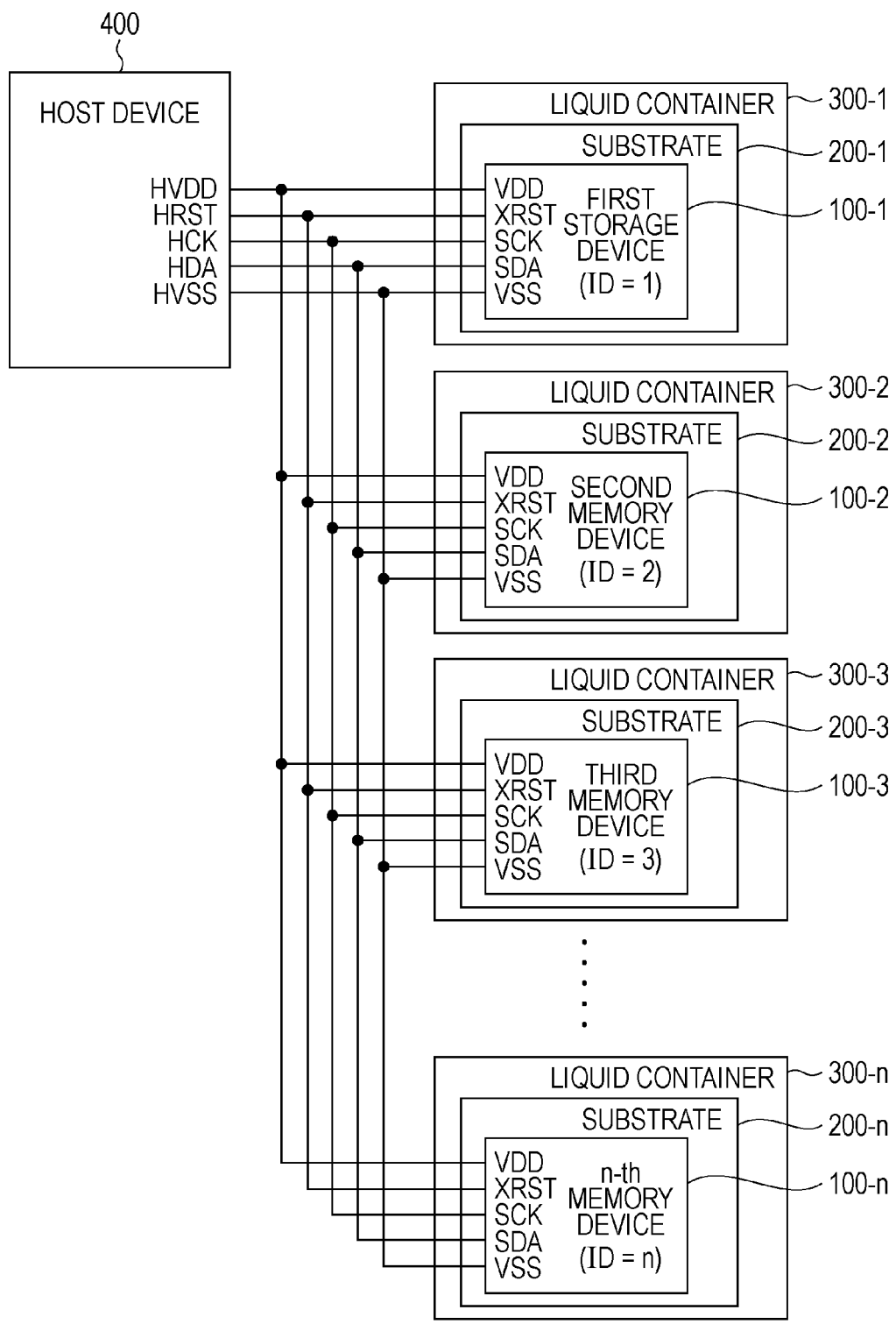
FIG. 1 is a diagram illustrating a basic configuration example of a system.

FIG. 1 shows a basic configuration example of a system of an embodiment. The basic configuration example of the system of the embodiment includes memory devices of a first memory device 100-1 to an n-th memory device 100-n (n is an integer of 2 or more), n boards 200-1 to 200-n on which the memory devices are mounted, n liquid containers 300-1 to 300-n provided with the boards, and a host device 400. The system of the embodiment is not limited to the configuration shown in FIG. 1, and may be variously modified, for example, a part of constituent elements may be omitted or replaced by other constituent elements, or other constituent elements may be added.

Each of the first memory device 100-1 to the n-th memory device 100-n includes a reset terminal XRST, a clock terminal SCK, a data terminal SDA, a first power supply terminal VSS, and a second power supply terminal VDD. As described later, each of the n memory devices 100-1 to 100-n includes a memory unit (e.g., a nonvolatile memory, etc.), and each memory unit stores ID (Identification) information (e.g., ID=1, ID=2, and ID=3, etc.) for identifying the n liquid containers (e.g., ink cartridges, etc.) 300-1 to 300-n. The different IDs are given according to kinds of colors or the like of liquid contained in the liquid containers.

The memory devices of the first to n-th memory devices 100-1 to 100-n and the host device 400 are electrically connected through a bus as shown in FIG. 1. The bus includes reset signal lines, clock signal lines, and data signal lines, and communication is performed between the memory devices 100-1 to 100-n and the host device 400 through the bus. The bus may include first and second power supply lines for supplying first and second power to the memory devices.

Each memory device has a normal communication mode (a normal operation mode) and a connection detection mode as an operation mode. The normal communication mode is a mode of transmitting data of the memory unit to the host device, or updating the data of the memory unit by data received from the host device. The connection detection mode is an operation mode of the memory device when detecting whether or not each memory device is connected to the host device.

In the connection detection mode, each memory device outputs a response signal for reporting connection of the memory device to the host device 400 through the data terminal SDA, according to a clock cycle of clocks supplied from the host device 400.

The clock cycle is not a physical period of the clock signal supplied from the host device 400, but is a logical period for controlling a communication process between the host device 400 and the memory device 100. Accordingly, for example, one clock cycle may be one physical period of the clock signal, or one clock cycle may be two physical periods of the clock signal.

The host device 400 includes first host side terminal to k-th host side terminals (k is an integer of 2 or more). Specifically, the host device 400 includes, for example, a host side reset terminal HRST, a host side clock terminal HCK, a host side data terminal HDA, a first host side power supply terminal HVSS, and a second host side power supply terminal HVDD. The host device 400 is, for example, a printer body or the like, and determines whether or not the memory devices are connected by the response signals from the memory devices 100-1 to 100-n as described later, that is, whether or not the liquid containers 300-1 to 300-n are mounted.

As described above, according to the system of the embodiment, each memory device 100 outputs the response signal for reporting the connection of the memory device to the host device 400 through the data terminal SDA. In such a manner, the terminal for detecting whether or not there is the liquid container 300 is unnecessary, and it is possible to reduce the number of terminals.

2. Memory Device

Figure 2:
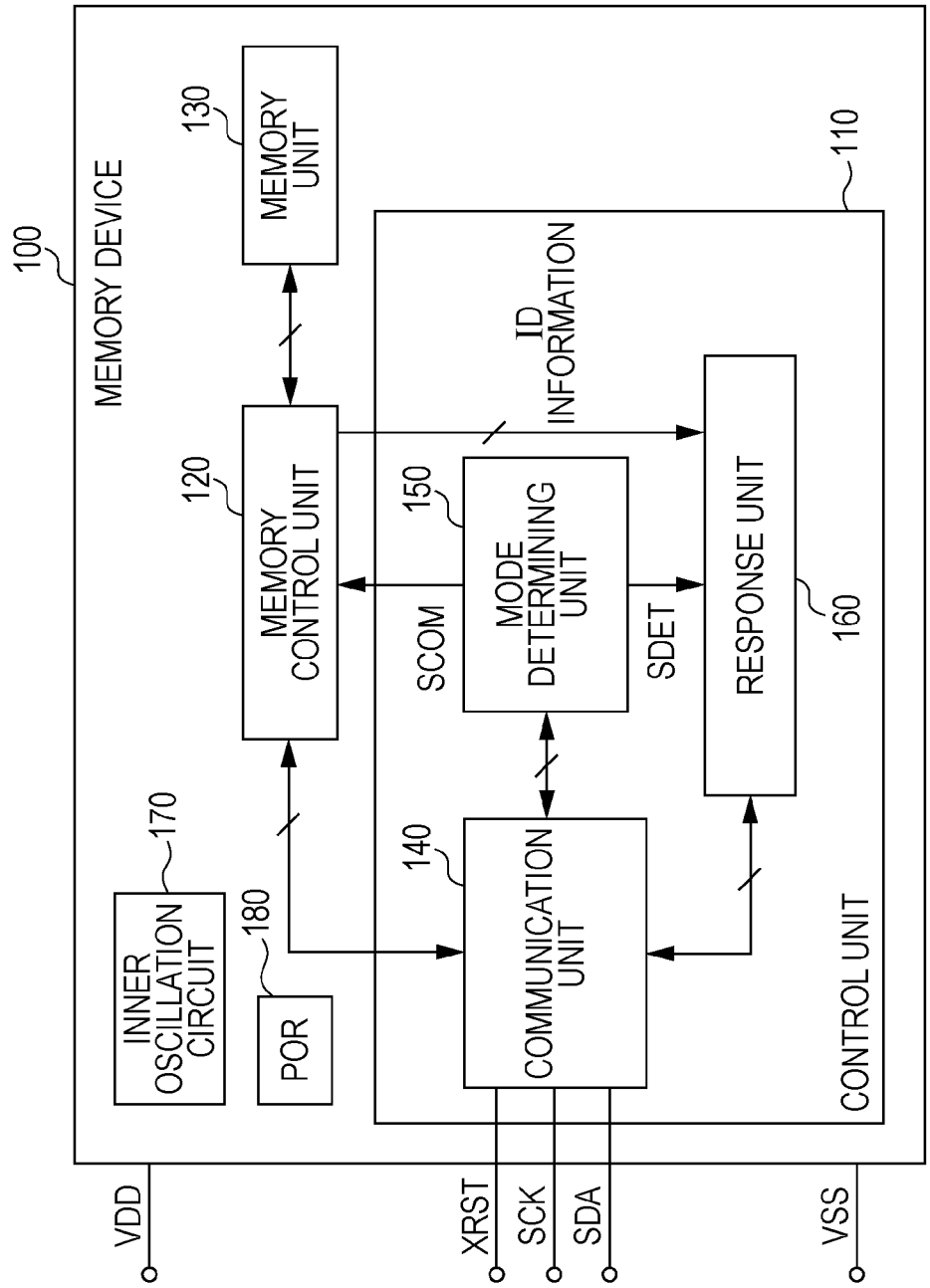
FIG. 2 is a diagram illustrating a basic configuration example of a memory device.

FIG. 2 shows a basic configuration example of the memory device 100 of the embodiment. The memory device 100 includes a control unit 110, a memory control unit 120, a memory unit 130, a data terminal SDA, a reset terminal XRST, and a clock terminal SCK. The memory device 100 of the embodiment is not limited to the configuration shown in FIG. 2, and may be variously modified, for example, a part of constituent elements may be omitted or replaced by other constituent elements, or other constituent elements may be added.

The memory unit 130 stores ID information and production information written at the production time and information written from the host device 400. For example, in a case of an ink cartridge, the memory unit 130 stores information of production date and information of ink color as the production information, and stores information of the amount of remaining ink as the information written from the host device 400. The memory unit 130 is formed of a nonvolatile memory such as a FERAM (ferroelectric memory) or a flash memory.

To store ID information for identifying the memory device 100 in the memory unit 130 such as the nonvolatile memory is not essential constituent requirement. For example, it is possible to store the ID information using a fuse element, or it is possible to output the ID information by a logic circuit.

The memory control unit 120 controls an access of the memory unit 130 in the normal communication mode (normal operation mode) and the connection detection mode.

The control unit 110 includes a communication unit 140, a mode determining unit 150, and a response unit 160. The communication unit 140 communicates with the host device 400. The mode determining unit 150 determines whether the operation mode is the normal communication mode (normal operation mode) or the connection detection mode. When it is determined that the operation mode is the normal communication mode, a control signal SCOM for the memory control unit 120 is make into an active level, and when it is determined that the operation mode is the connection detection mode, a control signal SDET for the response unit 160 is set to an active level.

In the normal communication mode, the communication unit 140 determines whether or not the ID information transmitted from the host device 400 coincides with the ID information thereof, or performs a command analysis of a received command (a writing command and a reading command, etc.).

The normal communication mode (normal operation mode) is an operation mode of performing data communication for transmitting and receiving data such as the amount of remaining ink between the host device 400 and the memory device 100.

The connection detection mode is an operation mode for detecting whether or not the memory device 100 is connected.

When it is determined that the operation mode is the connection detection mode, the response unit 160 issues an instruction to output a response signal for reporting the connection of the memory device to the communication unit 140. Specifically, when the control signal SDET from the mode determining unit 150 is the active level, the response unit 160 performs an instruction to output the response signal to the communication unit 140 in the clock cycle corresponding to the ID information on the basis of the ID information read from the memory unit 130 through the memory control unit 120.

An inner oscillation circuit 170 generates an internal clock of the memory device 100 and supplies the internal clock to the control unit 110, the memory control unit 120, the memory unit 130, and the like.

A power-on reset (POR) circuit 180 performs a power-on reset process on the basis of the second power supply voltage VDD. That is, the memory device 100 is in a reset state before power is supplied, and the reset of the memory device 100 is released when power is supplied. Specifically, when power is supplied to the host device 400 and a difference between the second power supply voltage VDD and the first power supply voltage VSS is higher than a threshold voltage (a predetermine voltage), the power-on reset circuit 180 makes a power-on reset signal POROUT into a H level (a high potential level, broadly the second voltage level).

As described above, according to the memory device of the embodiment, it is possible to output the response signal reporting the connection of the memory device to the host device through the data terminal SDA. In such a manner, the terminal for detecting whether or not there is the liquid container is unnecessary, and it is possible to reduce the number of terminals. When the ID information is stored in the memory unit, only the ID information may be read from the memory unit in the connection detection mode. Accordingly, it is possible to prevent the stored contents from being unintentionally broken by prohibiting (masking) the access to the other data. In addition, since it is possible to detect whether or not there is one memory device (the liquid container) during a period of one clock cycle, it is possible to reduce the detection time.

Meanwhile, in the normal communication mode (normal operation mode), it is possible to detect whether or not there is the liquid container by detecting a timeout error of communication. However, a time is taken until the timeout error occurs due to the buss connection, and thus the time to detection extends. When the time for detection extends, probability of error occurrence during communication becomes high. As a result, although the liquid container is mounted, it may be determined that the liquid container is not mounted.

Figure 3:
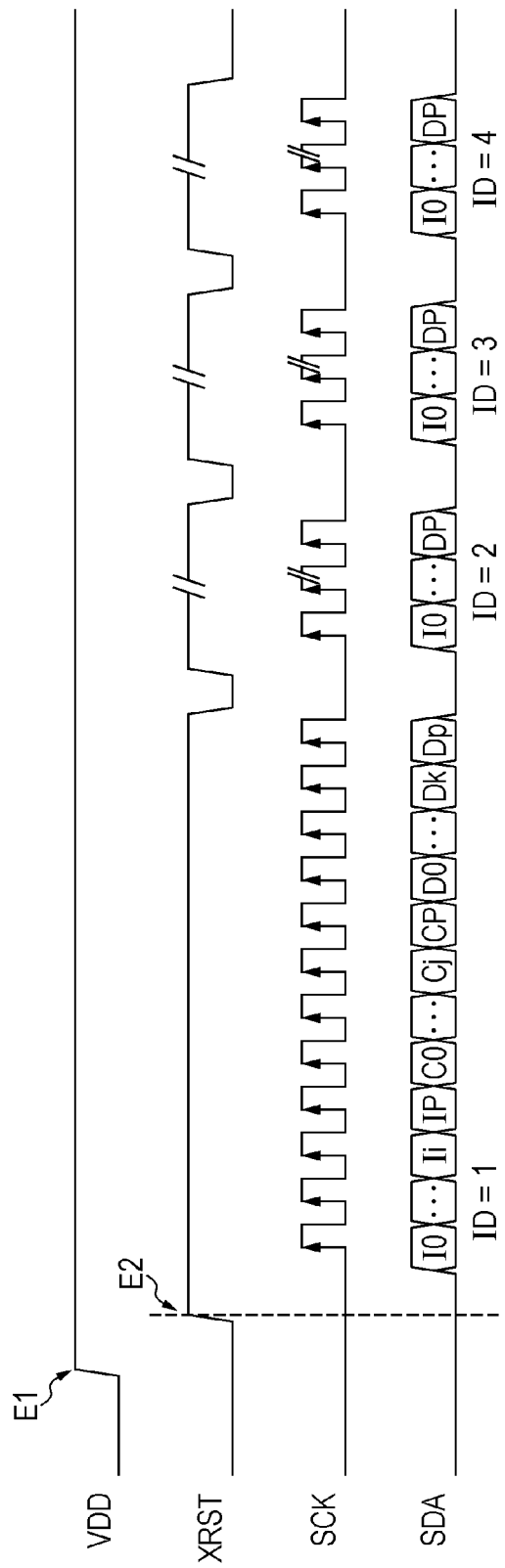
FIG. 3 is a diagram illustrating an example of a timing chart of a normal communication mode of the memory device.

FIG. 3 shows an example of a timing chart of the normal communication mode of the memory device 100. FIG. 3 shows the timing chart when the writing data is transmitted from the host device 400 to the first to fourth memory devices 100-1 to 100-4.

First, the host device 400 starts supplying power supply voltage to the memory devices through the second power supply line. When the voltage of the second power supply terminal VDD of each memory device reaches a predetermined voltage value (E1 in FIG. 3), the power-on reset is released by the power-on reset (POR) circuit 180.

Then, the host device 400 sets the reset signal level (broadly a voltage level of the reset terminal XRST) from a L level (broadly a voltage level indicating a reset state) to a H level (broadly a voltage level indicating a reset release state) (E2 in FIG. 3).

When the voltage level of the reset terminal XRST is changed from the voltage level (L level) indicating the reset state to the voltage level (H level) indicating the reset release state in the period when the voltage level of the clock terminal SCK is the first voltage level (L level) (E2 in FIG. 3), the mode determining unit 150 determines that the operation mode is the normal communication mode (normal operation mode).

Subsequently, the host device 400 supplies a clock to the clock terminal SCK and transmits the ID information, the writing command, and the data to the first memory device (ID=1) on the basis of the clock. As shown in FIG. 3, for example, the ID information is formed of i+1 bits of to Ii (i is a natural number), and a parity bit IP is added thereto. For example, the writing command is formed of j+1 bits of C0 to Cj (j is a natural number), and a parity bit CP is added thereto. For example, the writing data is formed of k+1 bits of D0 to Dk, and a parity bit DP is added thereto. The parity bits IP, CP, and DP are bits added to examine parities, and are bits added such that one number is always an odd number or an even number.

The communication unit 140 of the first memory device (ID=1) recognizes that the received ID information (ID=1) coincides with the ID information thereof (ID=1), and further recognizes that the received command is the writing command. The communication unit 140 outputs the received data to the memory control unit 120. The memory control unit 120 writes the data in the memory unit 130.

Meanwhile, the second to fourth memory devices (ID=2 to 4) recognize that the received ID information (ID=1) does not coincides with the ID information thereof, and do not receive the command and the data.

When the transmission of the data to the first memory device (ID=1) is completed, the host device 400 changes the voltage level of the reset terminal XRST from H level to L level, and returns the voltage level to the H level again. The host device 400 transmits the ID information, the writing command, and the data to the second memory device (ID=2).

The communication unit 140 of the second memory device (ID=2) recognizes that the received ID information (ID=2) coincides with the ID information thereof, and further recognizes that the received command is the writing command. The communication unit 140 outputs the received data to the memory control unit 120. The memory control unit 120 writes the data in the memory unit 130. In this case, the other memory devices recognize that the received ID information (ID=2) does not coincides with the ID information thereof, and do not receive the command and the data.

In such a manner, the host device 400 sequentially transmits the ID information, the writing command, and the data to the third and fourth memory devices (ID=3 and 4).

As described above, in the normal communication mode, the host device 400 transmits the writing data in the first to fourth memory devices 100-1 to 100-4, and can write the data in the memory unit 130 of each memory device. In addition, the host device 400 can receive the reading data from the memory units 130 of the memory devices.

Figure 4A:
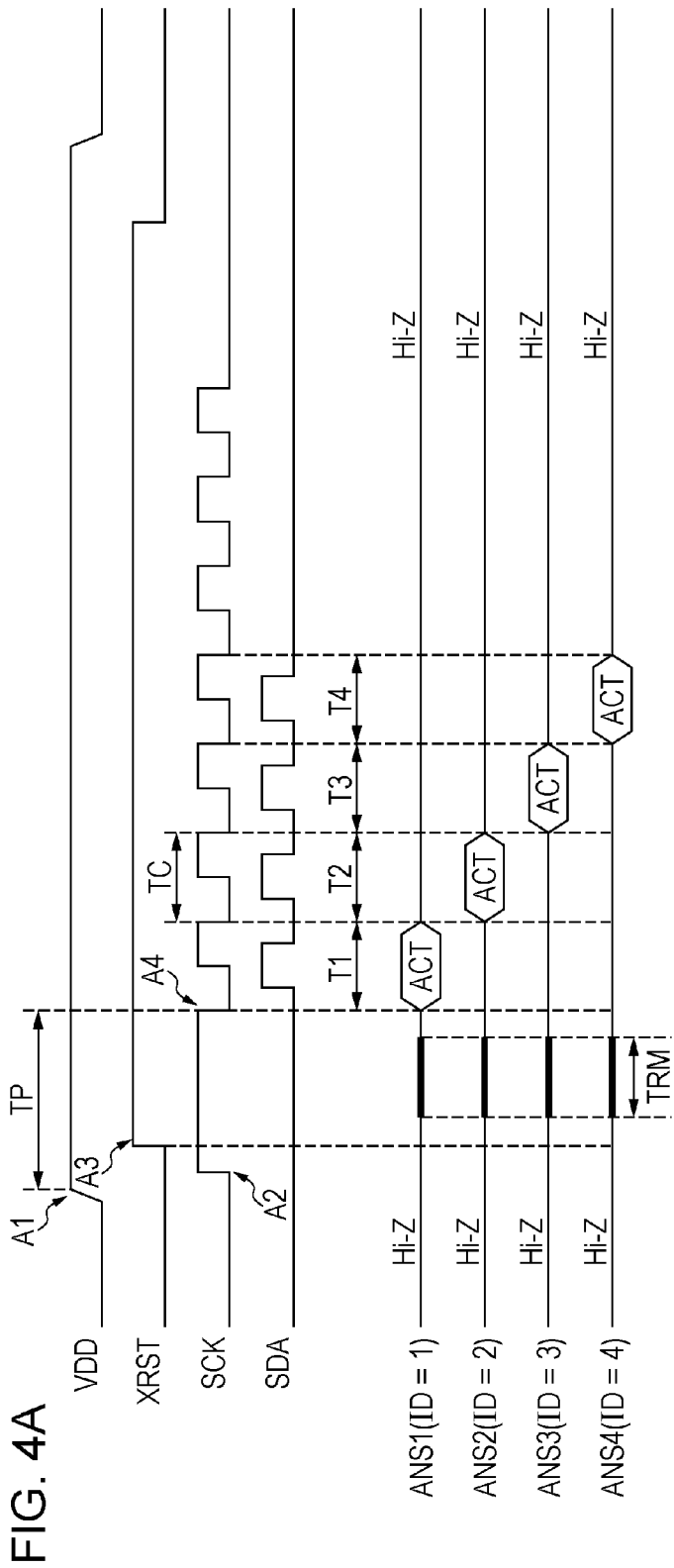
FIG. 4A and FIG. 4B are diagrams illustrating an example of a timing chart of a connection detection mode of the memory device.
Figure 4B:
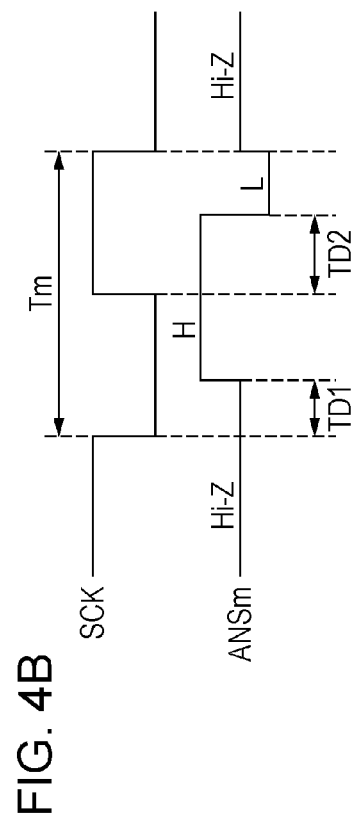

FIG. 4A and FIG. 4B shows an example of a timing chart of the connection detection mode of the memory device 100.

FIG. 4A shows a timing chart of the second power supply voltage VDD, the reset signal (broadly a signal input to the reset terminal XRST), and the clock signal (broadly a signal input to the clock terminal SCK), the data signal (broadly a signal input and output to the data terminal SDA), and the response signals ANS1 to ANS4. FIG. 4B shows a detailed timing chart in a period when each response signal ANSm (m is at least one integer of 1≤m≤n) is in the active state ACT.

An operation of the memory device 100 is described with reference to FIG. 4A. First, when the second power supply voltage VDD rises (A1 in FIG. 4A) and the VDD reaches a predetermined voltage value, the power-on reset (POR) circuit 180 makes the power-on reset signal POROUT (not shown) into the H level (high potential level, broadly the second voltage level) to release the reset.

Then, the clock signal level (broadly the voltage level of the clock terminal SCK) is changed from the L level (low potential level, broadly the first voltage level) to the H level (A2 in FIG. 4A), and subsequently the reset signal level (broadly the voltage level of the reset terminal XRST) is changed from the L level (broadly the voltage level indicating the reset state) to the H level (broadly the voltage level indicating the reset release state) (A3 in FIG. 4A).

When the voltage level of the reset terminal XRST is changed from the voltage level indicating the reset state (L level) to the voltage level indicating the reset release state (H level) in the period when the voltage level of the clock terminal SCK is the second voltage level (H level) (A3 in FIG. 4A), the mode determining unit 150 determines that the operation mode is the connection detection mode.

Then, the voltage level of the clock terminal SCK is changed from the H level to the L level (A4 in FIG. 4A). This timing is a start timing of a first clock cycle T1. That is, the response unit 160 determines the timing of changing the voltage level of the clock terminal SCK from the second voltage level (H level) to the first voltage level (L level) after the voltage level of the clock terminal SCK is changed from the first voltage level (L level) to the second voltage level (H level) after supplying power, as the start timing of the first clock cycle T1.

The control unit 110 outputs the response signal ANSm to the host device 400 through the data terminal SDA in the m-th clock cycle (m is at least one integer of 1≤m≤n) corresponding to the ID information of the memory device 100 among the first to n-th clock cycles input to the clock terminal SCK (n is an integer of 2 or more).

In the timing chart shown in FIG. 4A, one clock cycle is one physical period of the clock signal, but the invention is not limited thereto. For example, two physical periods of the clock signal may be one clock cycle.

Specifically, for example, as shown in FIG. 4A, the memory device 100-1 with the ID information of 1 outputs the response signal ANS1 in the first clock cycle T1. The memory device 100-2 with the ID information of 2 outputs the response signal ANS2 in the second clock cycle T2. Similarly, the response signals ANS3 and ANS4 are output. After determined as the connection detection mode, the ID information of each memory device is read from the memory unit 130 of each memory device 100 in an ID information reading period TRM before the start timing of the first clock cycle T1.

When a length from the power supply timing (A1 in FIG. 4A) to the start timing (A4 in FIG. 4A) of the first clock cycle T1 is TP and a length of each clock cycle of the clocks input to the clock terminal SCK is TC, TP>TC is satisfied. That is, the response unit 160 determines the timing of changing the voltage level of the clock terminal SCK from the second voltage level (H level) to the first voltage level (L level) after a period longer than the TC from the power supply timing, as the start timing.

In such a manner, it is possible to secure the time until the reset is released by the power-on reset circuit 180 after supplying power, the circuits of the memory device 100 starts operating, the mode determining unit 150 determines the operation mode as the connection detection mode, and subsequently the ID information is read from the memory unit 130.

FIG. 4B is a detailed timing chart in which the response signal ANSm is the active state ACT. In the period of the m-th clock cycle Tm, the response signal ANSm is changed from a high impedance state (Hi-Z) to the H level, then is changed from the H level to the L level, and is returned to the high impedance state (Hi-Z) again. The response signal ANSm is changed from the high impedance state (Hi-Z) to the H level at the time point when the first delay time TD1 elapses from the start timing (i.e., gradually falling timing of SCK) of the m-th clock cycle Tm. The response signal ANSm is changed from the H level to the L level at the time point when the second delay time TD2 elapses from the rising timing of SCK. As described above, the first and second delay times TD1 and TD2 are provided, and thus it is possible to prevent two response signals from interfering with each other when the response signals are output in two adjacent clock cycles (e.g., the second and third clock cycles).

Figure 5A:
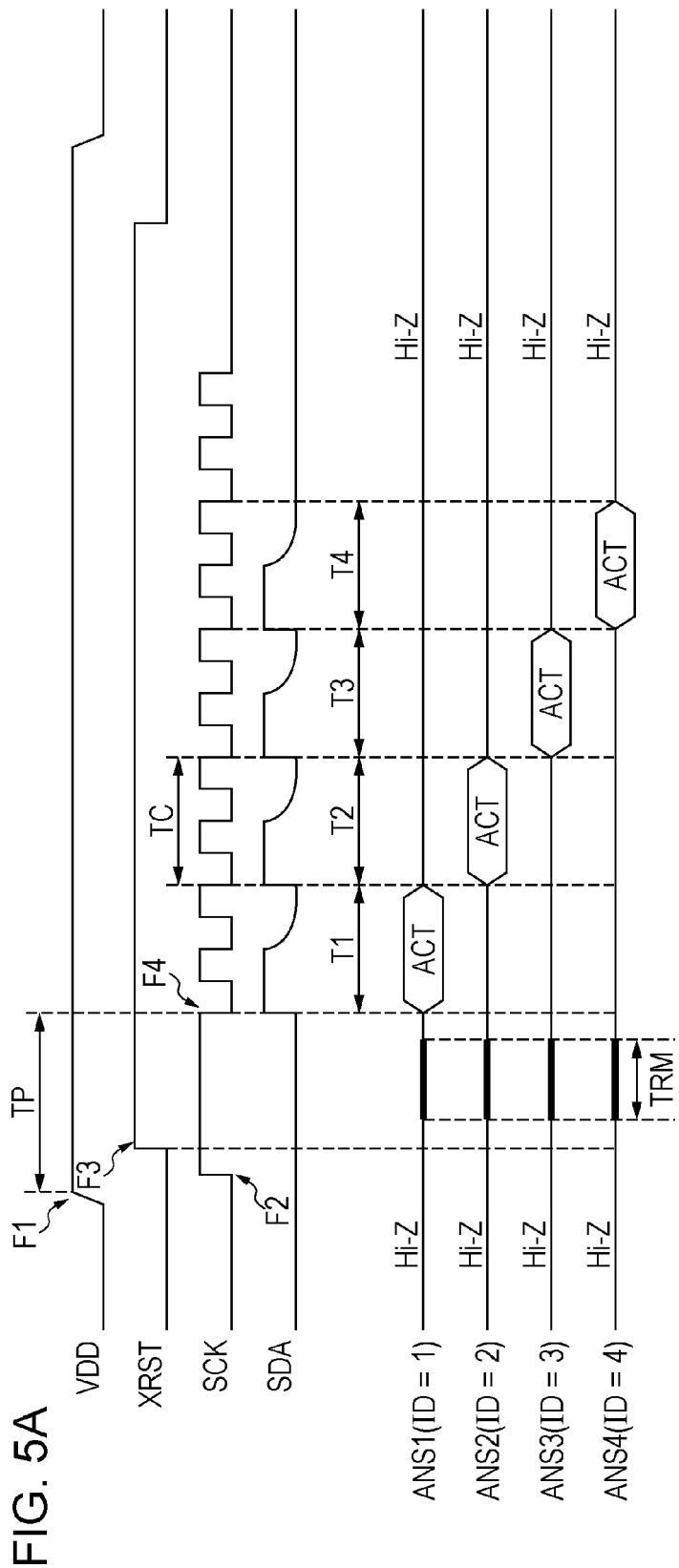
FIG. 5A and FIG. 5B are diagrams illustrating another example of a timing chart of a connection detection mode of the memory device.
Figure 5B:
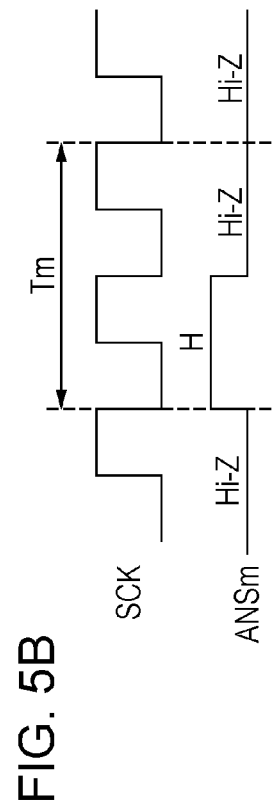

FIG. 5A and FIG. 5B are another example of a timing chart of the connection detection mode of the memory device 100. FIG. 5A shows a timing chart of the second power supply voltage VDD, the reset signal (broadly a signal input to the reset terminal XRST), the clock signal (broadly a signal input to the clock terminal SCK), the data signal (broadly a signal input and output to the data terminal SDA), and the response signals ANS1 to ANS4. FIG. 5B shows a detailed timing chart in a period when each response signal ANSm is in the active state ACT. The timing chart of FIG. 5A and FIG. 5B is the same in the mode determination as the case of FIG. 4A described above, but there is a difference in waveform of the response signal.

First, when the second power supply voltage VDD rises (F1 in FIG. 5A) and the VDD reaches a predetermined voltage value, the power-on reset (POR) circuit 180 makes the power-on reset signal POROUT (not shown) into the H level to release the reset.

Then, the clock signal level (broadly the voltage level of the clock terminal SCK) is changed from the L level to the H level (F2 in FIG. 5A), and subsequently the reset signal level (broadly the voltage level of the reset terminal XRST) is changed from the L level to the H level (F3 in FIG. 5A).

When the voltage level of the reset terminal XRST is changed from the voltage level indicating the reset state (L level) to the voltage level indicating the reset release state (H level) in the period when the voltage level of the clock terminal SCK is the second voltage level (H level) (F3 in FIG. 5A), the mode determining unit 150 determines that the operation mode is the connection detection mode.

Then, the voltage level of the clock terminal SCK is changed from the H level to the L level (F4 in FIG. 5A). This timing is a start timing of a first clock cycle T1. That is, the response unit 160 determines the timing of changing the voltage level of the clock terminal SCK from the second voltage level (H level) to the first voltage level (L level) after the voltage level of the clock terminal SCK is changed from the first voltage level (L level) to the second voltage level (H level) after supplying power, as the start timing of the first clock cycle T1.

The control unit 110 outputs the response signal ANSm to the host device 400 through the data terminal SDA in the m-th clock cycle corresponding to the ID information of the memory device 100 among the first to n-th clock cycles input to the clock terminal SCK.

In the timing chart shown in FIG. 5A, two physical periods of the clock signal is one clock cycle. For example, each of the clock cycles T1 to T4 of the first to fourth clock cycles is two physical periods of the clock signals.

As shown in FIG. 5A, the memory device 100-1 with the ID information of 1 outputs the response signal ANS1 in the first clock cycle T1. The memory device 100-2 with the ID information of 2 outputs the response signal ANS2 in the second clock cycle T2. Similarly, the response signals ANS3 and ANS4 are output. After determined as the connection detection mode, the ID information of each memory device is read from the memory unit 130 of each memory device 100 in an ID information reading period TRM before the start timing of the first clock cycle T1.

Similarly with FIG. 4A, when a length from the power supply timing (F1 in FIG. 5A) to the start timing (F4 in FIG. 5A) of the first clock cycle T1 is TP and a length of each clock cycle of the clocks input to the clock terminal SCK is TC, TP>TC is satisfied.

FIG. 5B is a detailed timing chart in which the response signal ANSm is the active state ACT. The control unit 110 sets the voltage level of the data terminal SDA to the second voltage level (H level) in the first period of the m-th clock cycle Tm. The control unit 110 outputs the response signal ANSm by setting the data terminal SDA to the high impedance state Hi-Z in the second period after the first period of the m-th clock cycle Tm. As described above, it is possible to prevent two response signals from interfering with each other when the response signal is output in the next clock cycle, by setting the data terminal SDA to the high impedance state Hi-Z in the second period of the clock cycle.

Since a pull-down resistor is provided between the data terminal HDA and the first power supply terminal HVSS of the host device 400, the voltage level of the data terminal SDA gradually drops from the H level to the L level when the data terminal SDA is set to the high impedance state Hi-Z in the second period of the clock cycle. As a result, for example, as shown in FIG. 5A, the voltage level becomes the H level in the first period in the clock cycles T1 to T4 corresponding to the first to fourth memory devices, and a signal gradually dropping to the L level is output in the second period.

FIG. 6A is a diagram illustrating an operation of the first configuration example of the mode determining unit 150. The mode determining unit 150 determines that the operation mode is the connection detection mode, when the voltage level of the reset terminal XRST is changed from the voltage level (L level) indicating the reset state to the voltage level (H level) indicating the reset release state in the period when the voltage level of the clock terminal SCK is the second voltage level (H level). The control signal SDET for the response unit 160 is set to the active level (H level).

Meanwhile, the mode determining unit 150 determines that the operation mode is the normal communication mode when the voltage level of the reset terminal XRST is changed from the voltage level (L level) indicating the reset state to the voltage level (H level) indicating the reset release state in the period when the voltage level of the clock terminal SCK is the first voltage level (L level). The control signal SCOM for the memory control unit 120 is set to the active level (H level).

FIG. 6B shows a first configuration example of the mode determining unit 150. In the configuration example, the mode determining unit 150 is configured using a D flip-flop circuit.

An operation of the circuit is the same as an operation of a general D flip-flop circuit. That is, at the rising edge of the voltage level of the reset terminal XRST, the voltage level of the clock terminal SCK is received and stored as an output SDET, and an inversed output thereof is stored as an output SCOM.

Figure 7A:
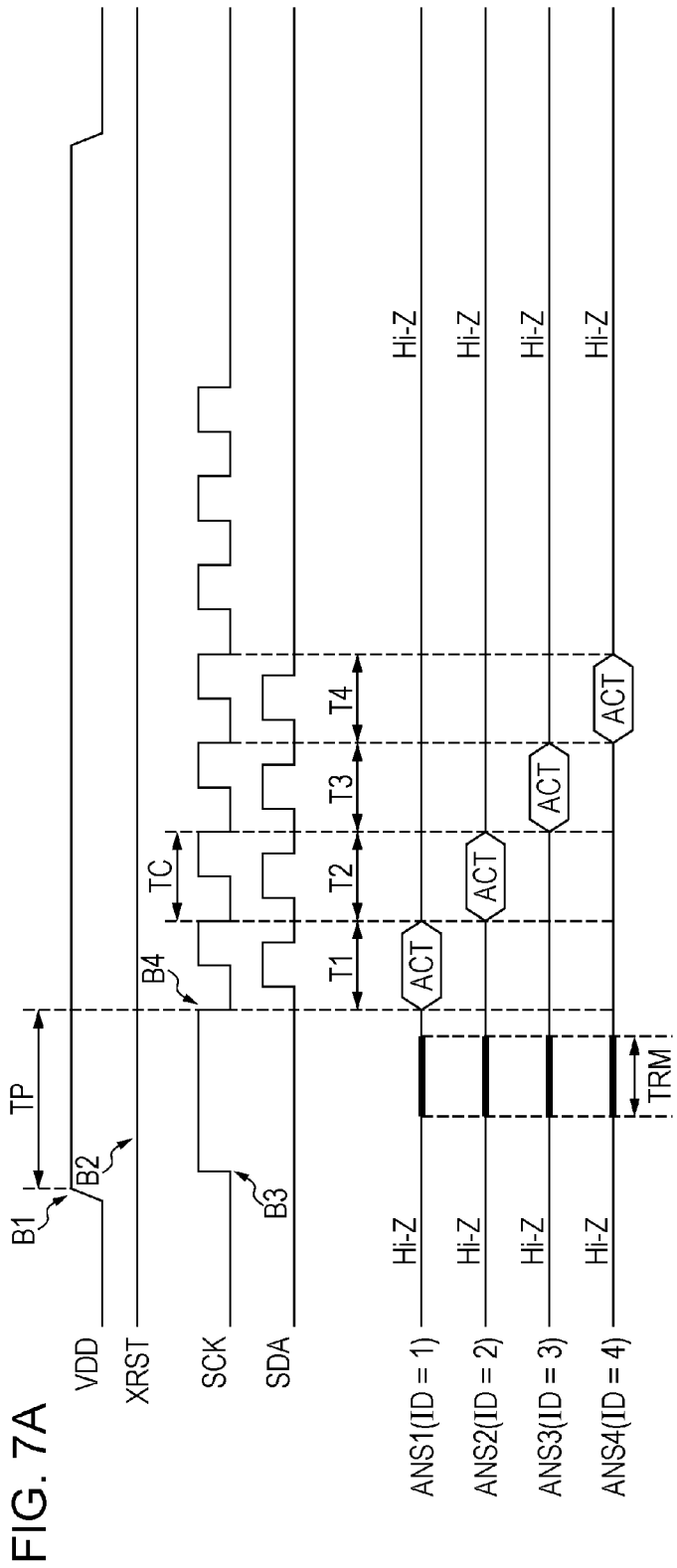
FIG. 7A and FIG. 7B are diagrams illustrating another example of a timing chart of a connection detection mode of the memory device.
Figure 7B:
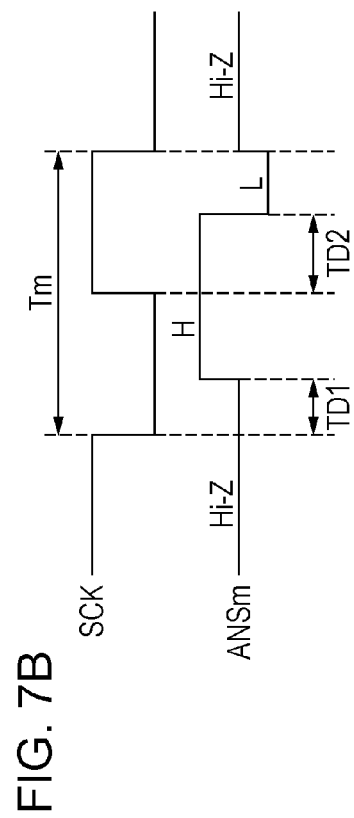

FIG. 7A and FIG. 7B show another example of a timing chart of the connection detection mode of the memory device 100. In the timing chart, a second configuration example of the mode determining unit 150 to be described later is used. The operation except for the operation on the mode determination is the same operation as FIG. 4A and FIG. 4B described above.

As shown in FIG. 7A, first, when the second power supply voltage VDD rises (B1 in FIG. 7A) and the VDD reaches a predetermined voltage value, the power-on reset (POR) circuit 180 makes the power-on reset signal POROUT (not shown) into the H level (high potential level, broadly the second voltage level) to release the reset.

In the second configuration example of the mode determining unit 150, it is determined that the operation mode is the connection detection mode when the voltage level of the clock terminal SCK is changed from the first voltage level (L level) to the second voltage level (H level) (B3 in FIG. 7A) in the period when the voltage level of the reset terminal XRST is the voltage level indicating the reset state (B2 in FIG. 7A).

Then, the voltage level of the clock terminal SCK is changed from the H level to the L level (B4 in FIG. 7A). This timing is a start timing of a first clock cycle T1. That is, the response unit 160 determines the timing of changing the voltage level of the clock terminal SCK from the second voltage level (H level) to the first voltage level (L level) after the voltage level of the clock terminal SCK is changed from the first voltage level (L level) to the second voltage level (H level) after supplying power, as the start timing of the first clock cycle T1.

Similarly with FIG. 4A, when a length from the power supply timing (B1 in FIG. 7A) to the start timing (B4 in FIG. 7A) of the first clock cycle T1 is TP and a length of each clock cycle of the clocks input to the clock terminal SCK is TC, TP>TC is satisfied.

The control unit 110 outputs the response signal ANSm to the host device 400 through the data terminal SDA in the m-th clock cycle corresponding to the ID information of the memory device 100 among the first to n-th clock cycles input to the clock terminal SCK. The specific description of the response signal ANSm is the same as FIG. 4A and FIG. 4B, and is omitted herein.

FIG. 8A to FIG. 8C are diagrams illustrating the second configuration example of the mode determining unit 150. As shown in FIG. 8A, in the second configuration example of the mode determining unit 150, it is determined that the operation mode is the connection detection mode when the voltage level of the clock terminal SCK is changed from the first voltage level (L level) to the second voltage level (H level) in the period when the voltage level of the reset terminal XRST is the voltage level (L level) indicating the reset state. The control signal SDET for the response unit 160 is set to the active level (H level).

Meanwhile, the mode determining unit 150 determines that the operation mode is the normal communication mode when the voltage level of the clock terminal SCK is changed from the first voltage level (L level) to the second voltage level (H level) in the period when the voltage level of the reset terminal XRST is the voltage level (H level) indicating the reset release state. The control signal SCOM for the response unit 160 is set to the active level (H level).

FIG. 8B shows the second configuration example of the mode determining unit 150. This configuration example includes a delay circuit, an AND logic, and an inverter. By providing two delay circuits, it is possible to prevent the control signal SDET and the control signal SCOM from being simultaneously the active level. The delay circuit may be formed by longitudinally connecting even number of inverters.

FIG. 8C is a timing chart illustrating an operation of the second configuration example of the mode determining unit 150. In the period when the voltage level of the reset terminal XRST is the voltage level (L level) indicating the reset state, the control signal SDET is the active level (H level). Meanwhile, in the period when the voltage level of the reset terminal XRST is the voltage level (H level) indicating the reset release state, the control signal SCOM is the active level (H level).

Figure 9:
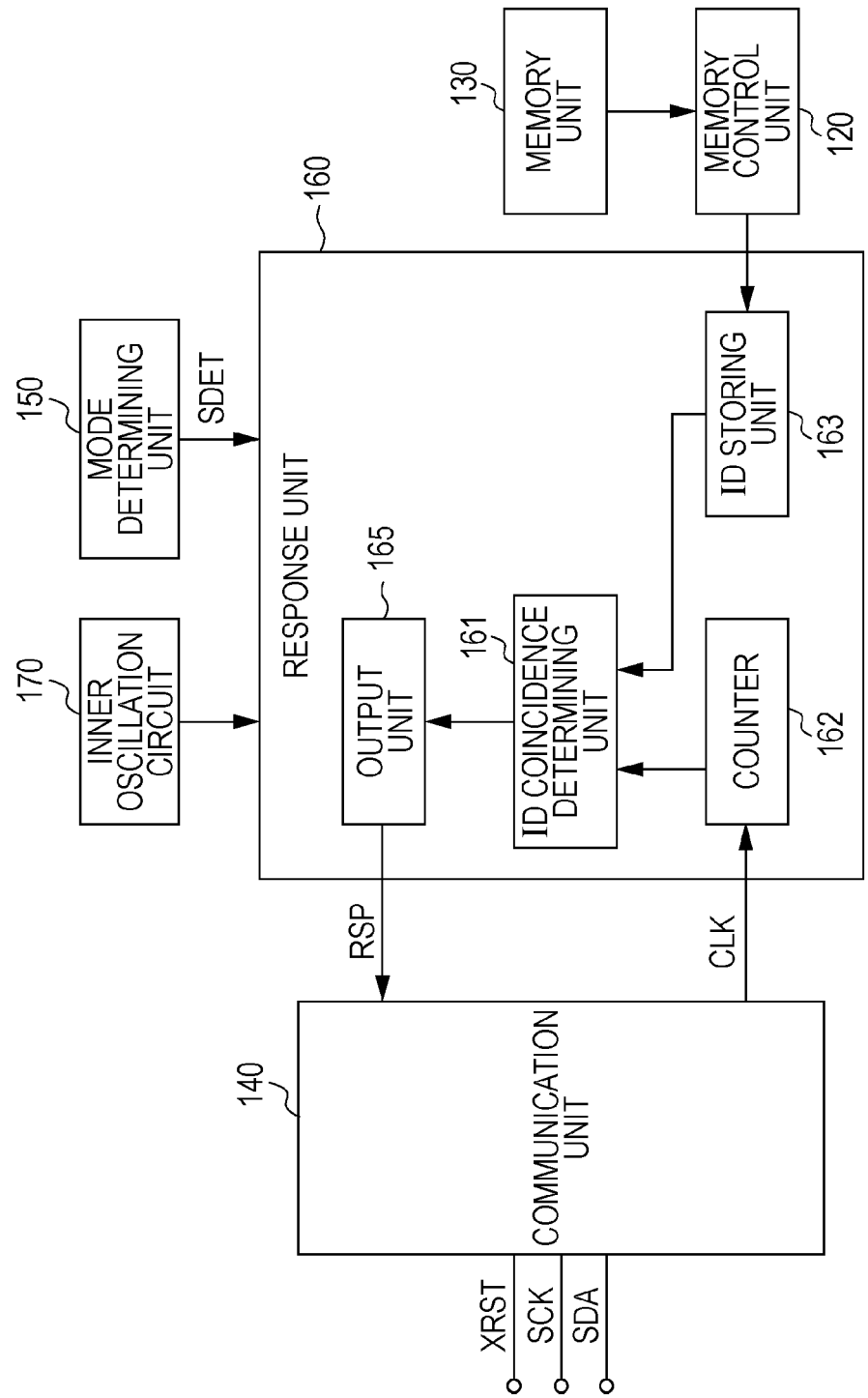
FIG. 9 is a diagram illustrating a basic configuration example of a response unit.

FIG. 9 shows a basic configuration example of the response unit 160. The response unit 160 includes an ID coincidence determining unit 161, a counter 162, an ID storing unit 163, and an output unit 165.

The ID coincidence determining unit 161 (coincidence determining unit) determines whether or not the count value of the counter 162 coincides with the value of the ID information read from the memory unit 130. The counter 162 performs a count process of the clock CLK input to the clock terminal SCK after the start timing of the first clock cycle T1. The ID storing unit 163 stores the value of the ID information read from the memory unit 130, and outputs the value to the ID coincidence determining unit 161. The output unit 165 outputs an output instruction RSP to output the response signal ANS to the communication unit 140 on the basis of the determination result of the ID coincidence determining unit 161.

The response unit 160 performs an instruction to output the response signal when the count value coincides with the value of the ID information. Specifically, for example, as shown in the timing chart of FIG. 4A, when the mode determining unit 150 determines that the operation mode is the connection detection mode (A3 in FIG. 4A), the mode determining unit 150 sets the control signal SDET to the active level. Then, the memory control unit 120 reads the value of the ID information from the memory unit 130 in the ID information reading period TRM, and the ID storing unit 163 stores the value of the ID information. Then, the counter 162 starts a count process of the clock CLK after the start timing (A4 in FIG. 4A) of the first clock cycle T1.

The ID coincidence determining unit 161 determines whether or not the count value of the counter 162 coincides with the value of the ID information. When the count value of the counter 162 coincides with the value of the ID information, the ID coincidence determining unit 161 outputs an output instruction RSP to output the response signal ANS from the output unit 165 to the communication unit 140. For example, as shown in FIG. 4A, since the count value is 1 in the first clock cycle T1, the response signal ANS1 is output from the memory device with ID=1. Similarly, since the count value is 2 in the second clock cycle T2, the response signal ANS2 is output from the memory device with ID=2. In such a manner, the response signal ANS is output in the clock cycle corresponding to the value of the ID information of each memory device.

FIG. 10 shows an example of correspondence between the ID information and the clock cycle. In FIG. 10, the value of the ID information is represented by 3 bits, and may be used from ID=0 to ID=7. However, as shown in FIG. 10, ID=0 may not be used. The first clock cycle T1 corresponds to ID=1, and the second clock cycle T2 corresponds to ID=2. In such a manner, the third to seventh clock cycles T3 to T7 correspond to ID=3 to 7, respectively. As the ID information, it is needless to necessarily use ID=7. For example, when the number of actually used ink cartridges (broadly the liquid containers) is 4, it is preferable to use ID=1 to 4 as the ID information. Specifically, for example, ID=1 to 4 may be associated with 4 colors (black, cyan, magenta, and yellow) of the ink cartridges.

FIG. 11 shows another example of correspondence between the ID information and the clock cycle. FIG. 11 also shows an integrated type liquid container in which one liquid container contains a plurality of colors of ink, in addition to one-color type liquid container in which one liquid container (ink cartridge) contains one color of liquid (ink, etc.).

For example, when the one-color type is used, as described above, ID=1 to 4 are associated with liquid containers with colors (black, cyan, magenta, and yellow), and it is possible to output the response signals in the clock cycles T1 to T4. When 4-color integrated type is used, the ID information is ID=7, and it is possible to output the response signals in the clock cycles T1 to T4. When one-color type of black and color-integrated type are commonly used, it is possible to output the response signal in the clock cycle T1 with the black one-color type ID information as ID=1, and it is possible to output the response signals in the clock cycles T2 to T4 with the color-integrated type ID information as ID=6.

As described above, according to the memory device 100 of the embodiment, the response unit 160 can performs the instruction to output the response signal in the plurality of clock cycles among the first to n-th clock cycles T1 to Tn. According to the liquid container 300 of the embodiment, when the liquid container 300 contains the plurality of colors of liquid, it is possible to output the response signals in the plurality of clock cycles corresponding to the plurality of colors among the first to n-th clock cycles T1 to Tn. In such a manner, it is possible to associate the first to n-th clock cycles with the n colors of ink, respectively. Accordingly, even when the ink cartridge is the one-color type or the integrated type, it is possible to associate them without changing firmware of the host device.

3. Board and Liquid Container

Next, a detailed configuration example of the liquid container 300 provided with the memory device 100 of the embodiment described above is described with reference to FIG. 12. Hereinafter, for example, the host device 400 is an ink jet printer, and the liquid container 300 is an ink cartridge, and a board 200 is a circuit board provided in the ink cartridge. However, in the embodiment, the host device, the liquid container, and the board may be other device, container, and board. For example, the host device may be a reader/writer of a memory card, and the board may be a circuit board provided in a memory card.

Figure 12:
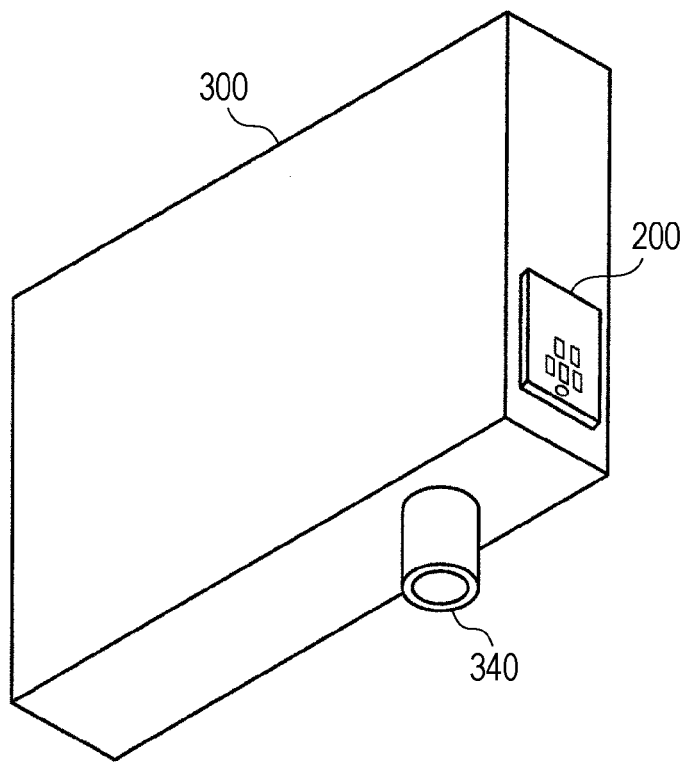
FIG. 12 is a diagram illustrating a specific configuration example of a liquid container.

An ink chamber (not shown) for containing ink is formed in the ink cartridge 300 (broadly the liquid container) shown in FIG. 12. The ink cartridge 300 is provided with an ink inlet 340 communicating with the ink chamber. The ink inlet 340 is provided to supply ink to a printing head unit when the ink cartridge 300 is mounted on the printer.

The ink cartridge 300 includes the circuit board 200 (broadly the board). The circuit board 200 is provided with the memory device 100 of the embodiment, and stores data or transmits and receives data to and from the host device 400. The circuit board 200 is formed by, for example, a printed board, and is provided on the surface of the ink cartridge 300.

The circuit board 200 is provided with terminals such as a second power supply terminal VDD. When the ink cartridge 300 is mounted on the printer, such a terminal and a printer side terminal comes into contact (electrical connection) with each other, thereby transmitting and receiving power and data.

Figure 13A:
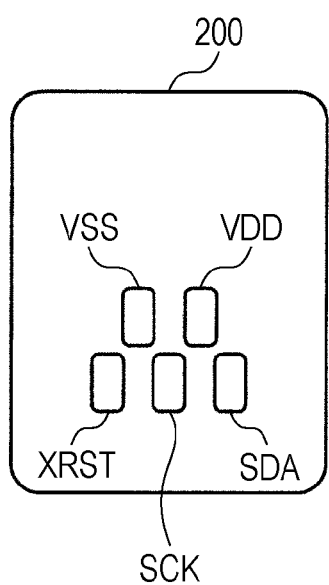
FIG. 13A and FIG. 13B are diagrams illustrating a specific configuration example of a circuit board.
Figure 13B:
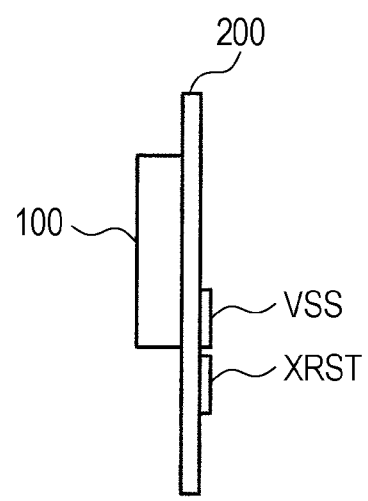

FIG. 13A and FIG. 13B show a detailed configuration example of the circuit board 200 provided with the memory device 100 of the embodiment. As shown in FIG. 13A, a terminal group having a plurality of terminals is provided on the front side (the side coming into contact with the printer) of the circuit board 200. The terminal group includes a first power supply terminal VSS, a second power supply terminal VDD, a reset terminal XRST, a clock terminal SCK, and a data terminal SDA. The terminals are formed by metal terminals formed, for example, in a rectangular shape (substantially rectangular shape). The terminals are connected to the memory device 100 through a writing pattern layer or through-holes (not shown) provided on the circuit board 200.

As shown in FIG. 13B, the memory device 100 of the embodiment is provided on the rear side (the rear side of the side coming into contact with the printer) of the circuit board 200. The memory device 100 may be formed by a semiconductor memory device having a ferroelectric memory. In the memory device 100, various kinds of data related to ink or the ink cartridge 300 are stored, for example, data such as ID information for identifying the ink cartridge 300 and the amount of ink consumption are stored. The data of the amount of ink consumption is data indicating total sum of the amount of ink consumed by performing a printing process with respect to ink contained in the ink cartridge 300. The data of the amount of ink consumption may be information indicating the amount of ink in the ink cartridge 300 and may be information indicating a ratio of the amount of consumed ink.

Figure 14A:
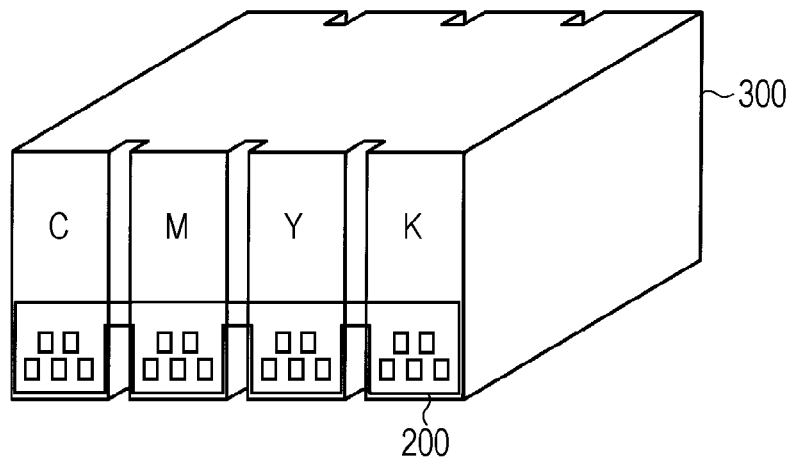
FIG. 14A to FIG. 14C are diagrams illustrating a detailed configuration example of a 4-color integrated liquid container and board.
Figure 14B:
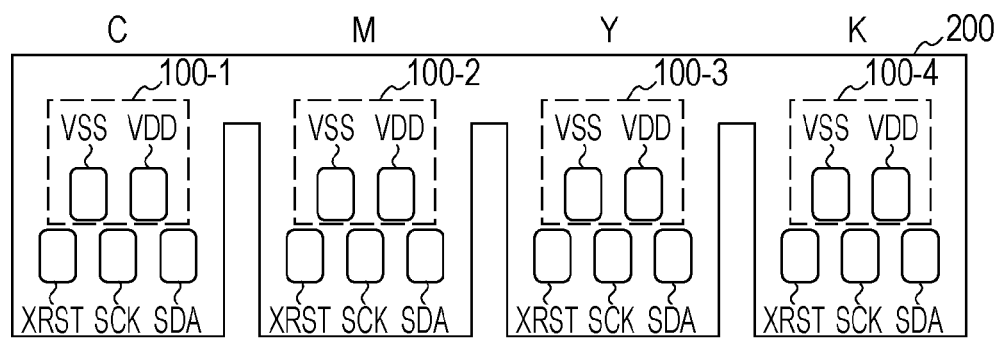
Figure 14C:
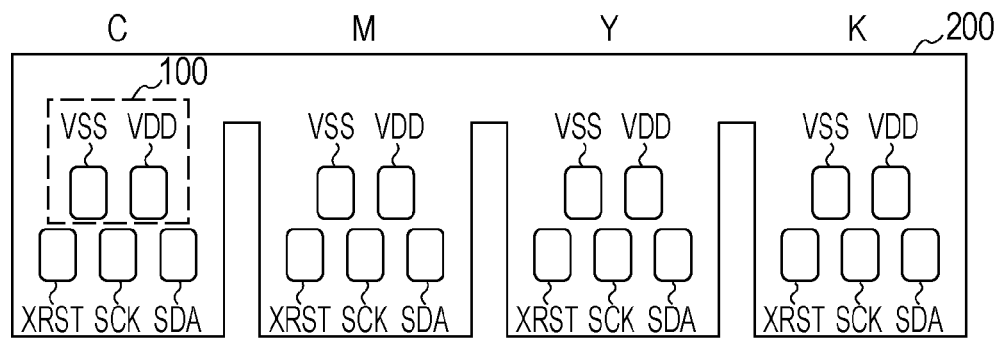

FIG. 14A to FIG. 14C shows a detailed configuration example of the 4-color integrated type liquid container 300 and the board 200. The 4-color integrated type liquid container (the ink cartridge) 300 shown in FIG. 14A contains four colors of liquid (ink) of black K, cyan C, magenta M, and yellow Y. The board 200 is a common board (broadly a board) used in the 4-color integrated type liquid container 300, and has four sets of terminal groups corresponding to four colors (C, M, Y, and K). Each of the terminal groups includes a first power supply terminal VSS, a second power supply terminal VDD, a reset terminal XRST, and a clock terminal SCK, and a data terminal SDA.

FIG. 14B shows a first configuration example of the common board (board) 200. This configuration example includes the first to fourth memory devices 100-1 to 100-4, and these four memory devices correspond to four colors (C, M, Y, and K), respectively. For example, the first memory device 100-1 has the ID information corresponding to liquid color of cyan C, and outputs the response signal in the period of the clock cycle corresponding to liquid color of cyan C in the connection detection mode. The memory devices are provided on the rear side (the opposite side to the side where the terminals are provided) of the common board 200, and thus are represented by broken lines.

FIG. 14C shows a second configuration example of the common board (board) 200. This configuration example includes one memory device 100. This one memory device has, for example, ID=7 shown in FIG. 11 as the ID information, and outputs the response signal in the period of four clock cycles corresponding to four liquid colors (C, M, Y, and K). In such a manner, since it is possible to output the response signals corresponding to four liquid colors by one memory device, it is possible to reduce a production cost.

In FIG. 14C, the memory device 100 is provided at a position corresponding to the liquid color of cyan C, but may be provided at a position corresponding to another liquid color. For example, the memory device may be provided at a position corresponding to magenta M or at a position corresponding to yellow Y.

In FIG. 14C, the terminal groups corresponding to the liquid colors (magenta M, yellow Y, and black K) for which the memory device is not provided may be electrically connected to the terminal group corresponding to cyan C for which the memory device is provided, or may not be electrically connected. Specifically, for example, the reset terminal XRST corresponding to magenta M may be electrically connected to the reset terminal XRST corresponding to cyan C, and may not be electrically connected.

The terminal groups corresponding to the liquid colors (magenta M, yellow Y, and black K) for which the memory device is not provided may not be provided.

The number of memory devices provided on the common board (board) 200 may be 2 or 3. For example, a first memory device corresponding to black K and a second memory device corresponding to the other three colors may be provided. Alternatively, a first memory device corresponding to black K, a second memory device corresponding to cyan C, and a third memory device corresponding to the other two colors may be provided.

4. Host Device

Figure 15:
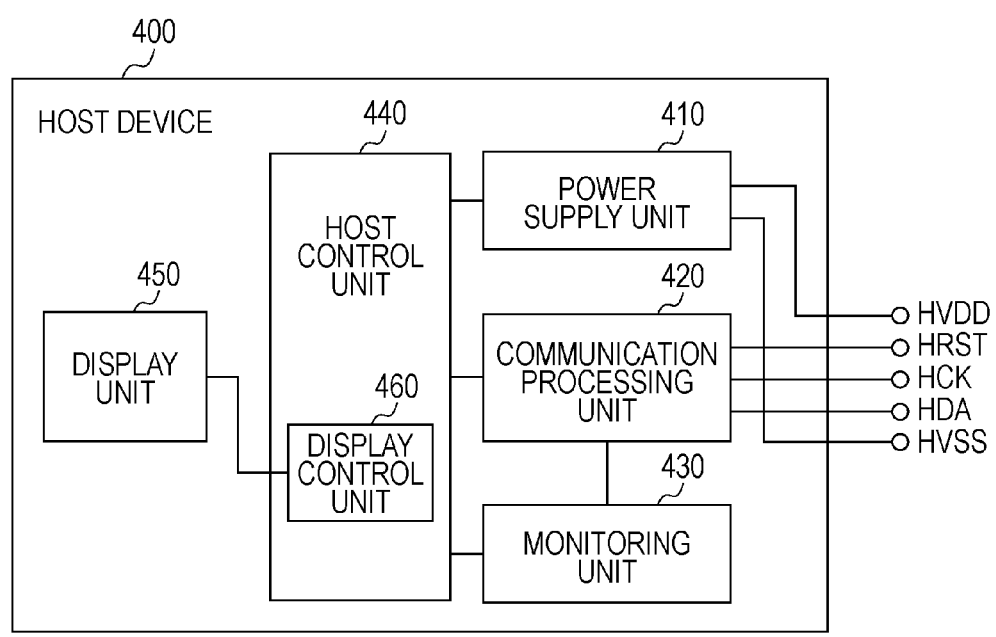
FIG. 15 is a diagram illustrating a basic configuration example of a host device.

FIG. 15 shows a basic configuration example of the host device 400 of the embodiment. The host device 400 is, for example, a printer body, and includes a power supply unit 410, a communication processing unit 420, a monitoring unit 430, a host control unit 440, a display unit 450, and a display control unit 460. The host device 400 further includes first to k-th host side terminals (k is an integer of 2 or more). Specifically, the host device 400 includes, for example, a host side reset terminal HRST, a host side clock terminal HCK, a host side data terminal HDA, a first host side power supply terminal HVSS, and a second host side power supply terminal HVDD.

The power supply unit 410 supplies power to the first to n-th memory device 100-1 to 100-$n$. The communication process unit 420 performs a communication process with the first to n-th memory devices 100-1 to 100-$n$ through the first to k-th host side terminals such as the host side reset terminal HRST, the host side clock terminal HCK, and the host side data terminal HDA.

The monitoring unit 430 monitors whether or not the response signal are output from the first to n-th memory devices 100-1 to 100-$n$ in the first to n-th clock cycles T1 to Tn of clocks supplied to the first to n-th memory devices 100-1 to 100-$n$.

The host control unit 440 performs a control process of each of the power supply unit 410, the communication processing unit 420, the monitoring unit 430, and the display unit 450.

The display unit 450 is, for example, an LCD (liquid crystal display) or the like, and displays an operation screen, an operation state, and an error message of the host device 400 (printer). In the connection detection mode, the display unit 450 displays the connection detection result on the basis of the monitoring result of the monitoring unit 430.

The display control unit 460 controls the display unit 450 to display the connection detection result. The display control unit 460 is formed by the known display controller or the like.

FIG. 16 is a diagram illustrating a power supply period of the normal communication mode and the connection detection mode. The power supply unit 410 supplies power to be TA>TB where TA is a length of the power supply period of the normal communication mode and TB is a length of the power supply period of the connection detection mode. A power supply period of the connection detection mode is provided between the power supply period of the normal communication mode and the power supply period of the next normal communication mode. Although not shown, a plurality of power supply periods of the connection detection mode may be continuously provided.

With such a configuration, since it is possible to provide the short period of the connection detection mode between the period of one normal communication mode and the period of the next normal communication mode, it is possible to detect the connection of the ink cartridge without trouble on normal data communication. As a result, it is possible to improve reliability of the printer system.

In addition, since it is possible to detect the connection of the ink cartridge in a short time, it is possible to display whether or not the ink cartridge is mounted in real time on the display unit 450. As a result, an error is prevented from occurring when a user replaces the ink cartridge, and it is possible to improve an operation property.

As a comparative method of the embodiment, a method of detecting a timeout error of communication in the normal communication mode (normal operation mode) is conceivable. However, this method has a problem that a time is taken until the timeout error occurs due to the buss connection, and thus the time to detect the connection extends. For this reason, probability of error occurrence during communication becomes high. When the error occurs, it may be determined that the ink cartridge is not mounted although the ink cartridge is mounted.

In the embodiment, the connection detection mode different from the normal communication mode is provided, it is possible to complete the connection detection in the period of the n clock cycles, for example, as shown in FIG. 4A, FIG. 5A, and FIG. 7A. Accordingly, as shown in FIG. 16, although the connection detection mode is provided separately from the normal communication mode, the length TB of the power supply period of the connection detection mode can be made sufficiently shorter than the length TA of the power supply period of the normal communication mode. In such a manner, the short-time period of the connection detection mode is set between the one period of the normal communication mode and the next period of the normal communication mode, and it is possible to perform the connection detection therein. As a result, it is not necessary to perform the connection detection for the normal communication mode, and it is possible to prevent the band of the communication mode from being limited, by providing the connection detection mode. Since it is possible to reduce the time necessary for the connection detection, it is possible to display the detection result in real time, and it is possible to reduce the errors at the detection time.

The embodiment has been described in detail above, but persons skilled in the art can easily understand that the embodiment may be variously modified within the scope which does not substantially deviate from novel items and effects of the invention. Accordingly, all of such modified examples are included in the scope of the invention. For example, in the specification and drawings, the other terms (the first voltage level and the second voltage level) having the broad meaning or the same meaning may be replaced by other terms (H level and L level) at any place of the specification and drawings. The configurations and operations of the memory device, the board, the liquid container, the host device, and the system are not limited to the description of the embodiment, and variously modified.

The entire disclosure of Japanese Patent Application Nos. 2010-035898, filed Feb. 22, 2010 and 2011-007766, filed Jan. 18, 2011 are expressly incorporated by reference herein.

What is claimed is:

1. A memory device comprising:
   a memory unit;
   a memory control unit that controls an access of the memory unit;
   a control unit that performs a communication process with a host device;
   a data terminal;
   a reset terminal; and
   a clock terminal,
   wherein the control unit outputs a response signal for reporting the connection of a memory device in an m-th clock cycle corresponding to ID information of the memory device among a first clock cycle and an n-th clock cycle of clocks input to the clock terminal, to the host device through the data terminal, wherein m is at least an integer of 1≤m≤n and n is an integer of 2 or more;
   wherein the control unit includes a mode determining unit that determines whether an operation mode is a normal communication mode or a connection detection mode, and a response unit that issues an instruction to output the response signal, and wherein when the mode determining unit determines that the operation mode is the connection detection mode, the response unit issues the instruction to output the response signal in the m-th clock cycle.

2. The memory device according to claim 1, wherein the control unit outputs the response signal by setting a voltage level of the data terminal to a second voltage level in a first period of the m-th clock cycle and setting the data terminal to a high impedance state in a second period after the first period of the m-clock cycle.

3. A board comprising the memory device according to claim 2.

4. The memory device according to claim 1, wherein the mode determining unit determines that the operation mode is the connection detection mode when the voltage level of the reset terminal is changed from a voltage level indicating a reset state to a voltage level indicating a reset release state in a period when the voltage level of the clock terminal is the second voltage level.

5. A board comprising the memory device according to claim 4.

6. The memory device according to claim 1, wherein the mode determining unit determines that the operation mode is the connection detection mode when the voltage level of the clock terminal is changed from the first voltage level to the second voltage level in a period when the voltage level of the reset terminal is the voltage level indicating a reset state.

7. The memory device according to claim 1, wherein the response unit determines a timing of changing the clock terminal voltage level from the second voltage level to the first voltage level after the clock terminal voltage level is changed from the first voltage level to the second voltage level after supplying power, as a start timing of the first clock cycle, and
   wherein the response unit issues the instruction to output the response signal in the m-th clock cycle after the start timing.

8. The memory device according claim 7, wherein a length of one clock cycle is TC and
the response unit determines a timing of changing the voltage level of the clock terminal from the second voltage level to the first voltage level after a period longer than TC from the power supply timing is elapsed.

9. The memory device according to claim 1, wherein the response unit includes a counter and a coincidence determining unit that determines whether or not a count value of the counter and a value of the ID information read from the memory unit coincide with each other, and
wherein the response unit issues the instruction to output the response signal when the count value and the value of the ID information coincide with each other.

10. The memory device according to claim 9, wherein the response unit determines a timing of changing from the second voltage level to the first voltage level after the voltage level of the clock terminal is changed from the first voltage level to the second voltage level after supplying power, as a start timing of the first clock cycle, and
wherein the counter counts a number of the clock cycle input to the clock terminal after the start timing.

11. The memory device according to claim 1, wherein the response unit issues the instruction to output the response signal in a plurality of clock cycles among the first clock cycle to the n-th clock cycle.

12. A board comprising the memory device according to claim 1.

13. A liquid container comprising the memory device according to claim 1.

14. The liquid container according to claim 13, wherein when the container contains a plurality of colors, the response signal is output in a plurality of clock cycles corresponding to the plurality of colors among the first clock cycle to the n-th clock cycle.

15. A system comprising:
the memory device according to claim 1; and
the host device.

16. A host device comprising:
a communication unit that performs a communication process with a first memory device to an n-th memory device through a host side terminal of a first host terminal to a k-th host side terminal, wherein n is an integer of 2 or more and k is an integer of 2 or more; and
a monitoring unit,
wherein the monitoring unit monitors whether or not a response signal is output from the first memory device to the n-th memory device in each clock cycle of a first clock cycle to an n-th clock cycle of clocks supplied to the first memory device to the n-th memory device,
a power supply unit that supplies power to the first memory device to the n-th memory device, wherein the power supply unit is provided with a power supply period of a connection detection mode between a power supply period of a normal communication mode and a power supply period of the next normal communication mode, and performs the power supply to be TA>TB where TA is a length of the power supply period of normal communication mode and TB is a length of the power supply period of the connection detection mode.

17. The host device according to claim 16, further comprising:
a display control unit that controls a display unit to display a connection detection result in the connection detection mode.

* * * * *